US006401088B1

(12) United States Patent
Jagadish et al.

(10) Patent No.: US 6,401,088 B1
(45) Date of Patent: Jun. 4, 2002

(54) METHOD AND APPARATUS FOR SUBSTRING SELECTIVITY ESTIMATION

(75) Inventors: Hosagrahar Visvesvaraya Jagadish, Ann Arbor, MI (US); Raymond Ng, Vancouver (CA); Divesh Srivastava, Summit, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/476,715

(22) Filed: Dec. 30, 1999

Related U.S. Application Data
(60) Provisional application No. 60/119,241, filed on Feb. 9, 1999.

(51) Int. Cl.⁷ .............................................. G06F 17/30
(52) U.S. Cl. ......................................................... 707/6
(58) Field of Search ............................................ 707/6

(56) References Cited

U.S. PATENT DOCUMENTS

| 4,833,712 A | * | 5/1989 | Bahl et al. ................... 704/243 |
| 5,150,430 A | * | 9/1992 | Chu .............................. 382/56 |
| 5,392,363 A | * | 2/1995 | Fujisaki et al. .............. 382/187 |
| 5,525,982 A | * | 6/1996 | Cheng et al. ................ 341/106 |
| 5,819,265 A | * | 10/1998 | Ravin et al. ................... 704/10 |
| 5,832,480 A | * | 11/1998 | Byrd et al. .................... 704/10 |
| 6,308,149 B1 | * | 10/2001 | Gaussier et al. ................ 704/9 |

* cited by examiner

Primary Examiner—Wayne Amsbury

(57) ABSTRACT

A method for estimating string-occurrence probability in a database comprises receiving a first probability of occurrence for each maximal substring from a plurality of substrings, each maximal substring in the plurality of substrings belonging to the string; obtaining an overall probability of occurrence; receiving a probability of occurrence for a maximal overlap of each maximal substring in the plurality of maximal substrings; obtaining a normalization factor; and dividing the overall probability of occurrence by the normalization factor to obtain the estimate.

35 Claims, 5 Drawing Sheets

FIG. 2

Algorithm KVI
Input: a PST $T$ with prune threshold $p$, and root count $N$; a substring query $\sigma$
Output: the estimate $KVI(\sigma)$ {{ 1. $i = 1$;
2. While ($\sigma$ not equal null) {
  2.1 $\gamma$ = the longest prefix of $\sigma$ found in $T$;
  2.2 If ($\gamma$ equal null) {
  2.3    $\alpha_i = \sigma[1]$;
  2.4    $Pr(\alpha_i) = p/N$; }
  Else {
  2.5    $\alpha_i = \gamma$;
  2.6    $Pr(\alpha_i) = C_{\alpha_i}/N$; }
  2.7 $\sigma = \sigma - \alpha_i$;
  2.8 $i = i + 1$; }
3. $KVI = \Pi_i Pr(\alpha_i)$; return($KVI$);
}}

Algorithm MO
Input: a PST $T$ with prune threshold $p$, and root count $N$; a substring query $\sigma$
Output: the estimate $MO(\sigma)$ {{ 1. $i = 1$; $\beta_0$ = null;
2. While ($\sigma$ not equal null) {
  2.1 $\gamma$ = the longest prefix of $\sigma$ found in $T$;
  2.2 If ($\gamma$ equal null) {
  2.3    $\beta_i = \sigma[1]$;
  2.4    $Pr(\beta_i) = p/N$;
  2.5    $i = i + 1$; }
  2.6 Else if ($\gamma$ is not a substring of $\beta_{i-1}$) {
  2.7    $\beta_i = \gamma$;
  2.8    $Pr(\beta_i) = C_{\beta_i}/C_{\beta_{i-1} \odot \beta_i}$;
  2.9    $i = i + 1$; }
  2.10 $\sigma = \sigma - \sigma[1]$; }
3. $MO = \Pi_i Pr(\beta_i)$; return($MO$);
}}

```
Algorithm MOC
Input:  a PST T with prune threshold p, and
        root count N; a substring query σ
Output: the estimate MOC (σ)

{ 1. MOC = MO(σ)
  2. let ConProj(σ, T, p) be of the form $C_\sigma \leq \nu_\sigma$;
  3. if $(MOC > \nu_\sigma/N)$ { MOC = $\nu_\sigma/N$; }
  4. return(MOC);
}
```

FIG. 5

Algorithm MOL
Input: a PST $T$ with prune threshold $p$, and root count $N$; a substring query $\sigma$
Output: the estimate $MOL(\sigma)$ { 1. construct $\mathcal{L}_\sigma$;
2. for all nodes $\alpha \in \mathcal{L}_\sigma$ of depth 0, $Pr(\alpha) = C_\alpha/N$
3. process nodes $\alpha$ in ascending order of $depth \geq 1$: {
  3.1   set $\gamma_1, \gamma_2$ the $l-$ and $r-$parent of $\alpha$;
  3.2   $Pr(\alpha) = Pr(\gamma_1) * Pr(\gamma_2)/Pr(\gamma_1 \odot \gamma_2)$; }
4. $MOL = Pr(\sigma)$; return($MOL$);
}

Algorithm MOLC
Input: a PST $T$ with prune threshold $p$, and root count $N$; a substring query $\sigma$
Output: the estimate $MOLC(\sigma)$ { 1. construct $\mathcal{L}_\sigma$;
2. for all nodes $\alpha \in \mathcal{L}_\sigma$ of depth 0, $Pr(\alpha) = C_\alpha/N$
3. process nodes $\alpha$ in ascending order of $depth \geq 1$: {
  3.1   set $\gamma_1, \gamma_2$ the $l-$ and $r-$parent of $\alpha$;
  3.2   $Pr(\alpha) = Pr(\gamma_1) * Pr(\gamma_2)/Pr(\gamma_1 \odot \gamma_2)$;
  3.3   let $ConProj(\alpha, T, p,)$ be $C_\alpha \leq v_\alpha$;
  3.4   if $(Pr(\alpha) > v_\alpha/N)$ { $Pr(\alpha) = v_\alpha/N$; } }
4. $MOLC = Pr(\sigma)$; return($MOLC$);
}

METHOD AND APPARATUS FOR SUBSTRING SELECTIVITY ESTIMATION

CROSS REFERENCE TO RELATED APPLICATIONS

This application claims priority to Provisional Application Ser. No. 60/119,241, "Substring Selectivity Estimation," filed on Feb. 9, 1999, the content of which is incorporated by reference herein.

FIELD OF THE INVENTION

The present invention relates generally to methods of querying a database. More particularly, the present invention relates to systems and methods for estimating substring selectivity in a database.

BACKGROUND OF THE INVENTION

With the growing importance of the Web, LDAP directory servers, and other text-based information stores, there is an ever greater need to evaluate queries involving string matching. One often wishes to obtain a quick estimate of the number of times a particular substring occurs in a database. A traditional application is for optimizing structured query language (SQL) queries with the "like" predicate (e.g. search for all names like "jones"); such predicates are pervasive in data warehouse queries, because of the presence of "unclean" data. Another example of a substring query is a wildcard query, which allows searches for partial matches on strings submitted as a query.

A commonly used data structure for indexing substrings in a database is the suffix tree, which is a trie that satisfies the following property: whenever a string is stored in the trie, then all suffixes of the string are stored in the trie as well. Given a substring query, one can locate all the desired matches using the suffix tree. A count-suffix tree is a variant of the suffix tree, which does not store pointers to occurrences of the substrings, but just keeps a count at the node corresponding to the substring in the tree. The storage requirements, nevertheless, of a full count-suffix tree can be prohibitive. Thus, methods have been proposed for estimating substring selectivity using another variation of the suffix tree: a pruned count-suffix tree ("PST") which retains only those substrings, and their counts, for which the count exceeds some prune threshold. FIG. 1 sets forth an example PST, with a prune threshold of 5. Labels are presented for (among others) substrings related to the database string "jones", with counts shown in parentheses for some of the nodes in the PST. Variations of basic selectivity estimation algorithms have been proposed that, given a PST and a substring query, estimate the fraction of the count associated with the root of the tree that satisfies the substring query. See Krishnan, et al., "Estimating Alphanumeric Selectivity in the Presence of Wildcards," Proceedings of the ACM SIGMOD Conference on Management of Data, pp. 282–93, 1996, hereby incorporated by reference for background purposes (the methods collectively referred to herein as the "KVI algorithm").

Histograms have also long been used for selectivity estimation in databases. They have been designed to work well for numeric attribute value domains, and one can obtain good solutions to the histogram construction problem using known techniques. For string domains, however, a histogram bucket that includes a range of consecutive lexicographic values is not likely to produce a good approximation, since the number of times a string occurs as a substring is not likely to be approximately the same for lexicographically successive substrings. Alternative methods have been proposed creating an end-biased histogram over a frequency sort of the attributes. Although the method has a close parallel to a PST, pruned count-suffix trees do better than such methods by taking domain knowledge into account.

Nevertheless, known estimation methods using PSTs can be inefficient and inaccurate. Thus, a need exists for systems and methods for performing substring selectivity estimation that are both more accurate and more efficient than currently-known systems and methods.

SUMMARY OF THE INVENTION

The present invention discloses systems and methods for estimating how many records in a database match a certain query condition. In particular, the present invention discloses systems and methods for substring selectivity that take advantage of database structure.

In one embodiment of the present invention, a probability of occurrence is received for each of a plurality of maximal substrings where each substring in the plurality of maximal substrings belongs to the string. All of these received probabilities of occurrence are multiplied together to obtain a single number, that number being called the first estimate. Next, a probability of occurrence for the maximal overlap of each string between adjacent strings in the plurality of substrings is received. The probabilities are all multiplied together to obtain a single number called a normalization factor. Finally, the first estimate is divided by the normalization factor to obtain a resulting estimate of substring selectivity.

BRIEF DESCRIPTION OF THE DRAWINGS

FIG. 2 is a representation of a comparison of a known substring-selectivity algorithm with a method in accordance with an embodiment of the present invention.

FIG. 5 is a representation of two methods in accordance with an embodiment of the present invention.

DETAILED DESCRIPTION

Figure 1:
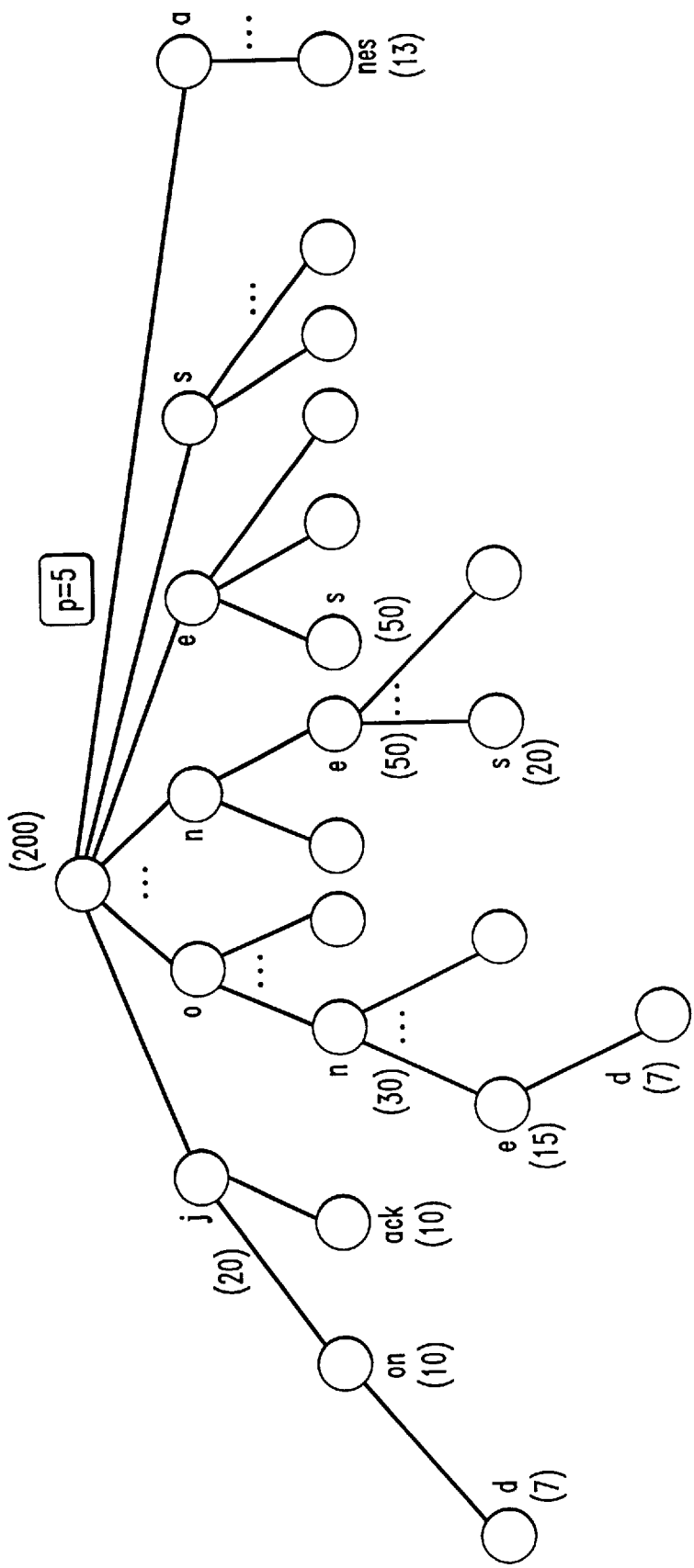
FIG. 1 is a pictorial representation of a pruned count-suffix tree.

Employing a frequency interpretation of probability, the notation $Pr(\sigma)$ is used to denote the selectivity of substring query $\sigma$, computed using a PST. If $\sigma$ is found in the PST, then $Pr(\sigma)$ can be simply computed as $Pr(\sigma)=C\sigma/N$ (where $C\sigma$ is the count for the substring $\sigma$ and N is the root count). If $\sigma$ is not found in the PST, then an estimate must be made of $Pr(\sigma)$. This is the essence of the substring selectivity estimation problem. Note that the count $C\sigma$ can have (at least) two useful meanings in a count-suffix tree. First, it can denote the number of strings in the database containing the substring, which the inventors define as a "p-suffix tree" ("p" for "presence"). Second, it can denote the number of occurrences of the substring in the database, which the inventors define as an "o-suffix tree" ("o" for "occurrence").

Let substring query $\sigma=\alpha_1 \ldots \alpha_w$, where concatenation of strings $\alpha_1$, $\alpha_2$, etc., is implicitly expressed in terms of adjacency. Then, $Pr(\sigma)$ can be written as follows:

$$Pr(\sigma) = Pr(\alpha_w|\alpha_1 \cdots \alpha_{w-1}) * Pr(\alpha_1 \cdots \alpha_{w-1})$$

$$= \cdots$$

$$= Pr(\alpha_j) * \left(\prod_{j=2}^{w} Pr(\alpha_j|\alpha_j \cdots \alpha_{j-1})\right)$$

Intuitively, $Pr(\alpha_j|\alpha_1 \ldots \alpha_{j-1})$ denotes the probability of occurrence of $\alpha_j$ given that the preceding string $\alpha_1 \ldots \alpha_{j-1}$ has been observed.

The prior art KVI algorithm takes advantage of the information in the PST, and assumes complete conditional independence. That is, it estimates each term in the above equation based on the following assumption: $Pr(\alpha_j|\alpha_1 \ldots \alpha_{j-1}) \approx Pr(\alpha_j)$. A detailed description of the KVI algorithm is given in FIG. 2. Given the substring query $\sigma$, KVI performs "greedy parsing" of $\sigma$. As an example of KVI, consider the PST shown in FIG. 1. The substring query $\sigma=$"jones" is parsed into "jon" and "es." Accordingly, KVI estimation provides the following solution:

$$Pr(jones) = Pr(jon) * Pr(es|jon)$$

$$= Pr(jon) * Pr(es)$$

$$= (C_{jon}/N) * (C_{es}/N)$$

$$= 1.25\%$$

1. Maximal Overlap

Complex sequences typically exhibit the following statistical property, called the short memory property: if one considers the (empirical) probability distribution on the next symbol a given the preceding subsequence $\alpha$ of some given length, then there exists a length L (the memory length) such that the conditional probability does not change substantially if conditioned on preceding subsequences of length greater than L. Thus, in accordance with an embodiment of the present invention that takes advantage of this statistical property, partial conditional dependence rather than complete conditional independence is assumed when estimating $Pr(\alpha_j|\alpha_1 \ldots \alpha_{j-1})$.

The "maximal overlap" between a suffix of $\beta_1$ and a prefix of $\beta_2$ (denoted by $\beta_1 \varnothing \beta_2$), is defined as $\alpha_2$ where strings $\beta_1=\alpha_1\alpha_2$ and $\beta_2=\alpha_2\alpha_3$ where $\alpha_2$ is maximal. The expression $\beta_2-(\beta_1 \varnothing \beta_2)$, accordingly, gives $\alpha_3$. With reference to FIG. 2, given a substring query $\sigma$, the maximal overlap algorithm ("MO") computes all maximal substrings $\beta_1, \ldots, \beta_u$ of $\sigma$ that can be found in the PST. These maximal substrings $\beta_1, \ldots, \beta_u$ satisfy collectively the condition: $\sigma=\beta_1[\beta_2-(\beta_1\varnothing\beta_2)] \ldots [\beta_u-(\beta_u \varnothing \beta_u)]$. With respect to the above equations, the query string can be decomposed into adjacent strings, $\alpha_i$, as follows: $\alpha_1=\beta_1$, and $\alpha_j=\beta_j-(\beta_{j-1}\varnothing\beta_j)$, $j>1$. Then, MO estimates the conditional probability of $\alpha_j$ given the preceding string $\alpha_1 \ldots \alpha_{j-1}$ as follows:

$$Pr(\alpha_j|\alpha_1 \cdots \alpha_{j-1}) = Pr(\alpha_j|\beta_{j-1}\varnothing\beta_j)$$

$$= Pr(\beta_j)/Pr(\beta_{j-1}\varnothing\beta_j)$$

That is, MO captures the conditional dependence of $\alpha_j$ on the immediately preceding (maximal overlap) substring $\beta_{j-1}\varnothing\beta_j$ of $\sigma$. As an example, again considering the PST in FIG. 1, the substring query $\sigma=$"jones" is parsed into $\beta_1=$"jon," $\beta_2=$"one" and $\beta_3=$"nes." Accordingly, $\beta_1\varnothing\beta_2$ and $\beta_2\varnothing\beta_3$ are the strings "on" and "ne," respectively. MO computes the following solution:

$$Pr(jones) = Pr(jon) * Pr(e|jon) * Pr(s|jone)$$

$$= Pr(jon) * Pr(e|on) * Pr(s|ne)$$

$$= (C_{jon}/N) * (C_{nes}/C_{ne}) * (C_{one}/C_{on})$$

$$= 1\%$$

While it is not universally true that $Pr(\alpha_j|\beta_{j-1}\varnothing\beta_j)$ is a better estimate than $Pr(\alpha_j)$ for all distributions, the MO strategy of conditioning based on the longest preceding subsequence in the PST is a rational strategy. Moreover, MO is provably better than KVI (in terms of log ratio) when the strings in the database exhibit the short memory property with memory length L and where maximal substrings $\beta_{i-1}\varnothing\beta_i$ has length $\geq L$ for all $i>1$.

2. Maximal Overlap With Constraints

In accordance with an embodiment of the present invention, accurate estimates can be developed using suffix tree constraints. For example, suppose the PST in FIG. 1 is a pruned o-suffix tree. For the substring query "jes," both KVI and MO estimate Pr(jes) as $Pr(j)*Pr(es)=2.5\%$. Since the counts $C_\alpha$ in an o-suffix tree record the number of occurrences of $\alpha$ in the database, it must be the case that $C_\alpha \geq \Sigma C_{\alpha\alpha 1}$, for strings $\alpha\alpha_1$ corresponding to the children nodes (not all descendant nodes) of $\alpha$ in the PST. Specifically, for the PST in FIG. 1, observe that $C_j=C_{jon}+C_{jack}$. Hence, no completion of the PST can have a non-zero count corresponding to the string "jes." Thus, using the constraints, it can be inferred that the substring selectivity of "jes" must be 0.

(Note that there is a key difference between pruned p-suffix tree constraints and pruned o-suffix tree constraints. The relationship $C_{60} \geq \Sigma C_{60\ \alpha 1}$ does not hold for pruned p-suffix trees; instead, only a much weaker relationship, $C_{60} \geq C_{60\ \alpha 1}$, holds for each child node $\alpha\alpha_1$ of $\alpha$ in the pruned p-suffix tree. For example, for the "jes" query, the database D might have 10 strings containing both "jack" and "jon," allowing for additional strings containing "jes.")

The set of all completions of a pruned o-suffix tree can be formally characterized as follows. An o-suffix tree is a completion of a PST T with a prune threshold p if and only if the counts associated with its strings satisfy ConComp(T, p), which is defined as the union of the following constraints:

$$\{ConSuffix(\alpha)|\alpha\epsilon A^*\} \cup \{ConPrefix(\alpha)|\alpha\epsilon A^*\} \cup \{ConPrune(\alpha, T, p)|\alpha\epsilon A^*\}$$

Given a string $\alpha$, ConSuffix($\alpha$) is defined as the following equality:

$$C_\alpha = O_\alpha + \Sigma\alpha_1\epsilon A(C\alpha\alpha_1) + \Sigma\alpha_2\epsilon A(C\alpha_2\alpha - \Sigma\alpha_3\epsilon A(C\alpha_2\alpha\alpha_3))$$

which represents the three components contributing to $C_\alpha$: namely the string will appear (1) first as a string by itself in the database (denoted $O_\alpha$); (2) second, as a proper, non-suffix, substring of a string in the database; and (3) third, as a suffix of a string in the database. These three components contributing to $C_\alpha$ can be expressed in terms of prefixes instead of suffixes. This provides the definition for the ConPrefix($\alpha$) constraint:

$$C_\alpha = O_\alpha + \Sigma\alpha_1\epsilon A(C\alpha_1\alpha) + \Sigma\alpha_2\epsilon A(C_{60\ \alpha 2} - \Sigma\alpha_3\epsilon A(C\alpha_3\alpha\alpha_2))$$

Next, the completion must agree with the semantics of the PST, which are formalized in the definition of ConPrune($\alpha$, T, p) as:

$$C_\alpha = k_\alpha, \text{ if } \alpha \text{ in } T$$

$$\leq p, \text{ otherwise}$$

A straightforward corollary of the above result is that only strings $\alpha$ need be considered in ConComp(T,p) that are bounded in length by N, the root count of T. A similar exercise can be repeated to give a complete characterization of completions of a pruned p-suffix tree.

In accordance with an embodiment of the present invention, the above constraints can be used to improve the MO estimate—in particular, in the situation when the estimate is "infeasible." It is possible that the estimate MO($\sigma$) (and KVI($\sigma$)), which uses only "local" information from the PST, is infeasible, i.e., it is impossible for any completion of the tree to agree with this estimate. The above example illustrates such a situation. Unfortunately, determining whether MO($\sigma$) is feasible, with regard to ConComp(T,p), is NP-hard. Instead, ConComp(T, p) needs to be approximated, where a sound-approximation of a set of constraints is one whose solution space is a superset of that of the original set of constraints. (the ConPrune set can be used as a simple sound-approximation; however, a "better" approximation can be obtained without sacrificing a polynomial-time check of the feasibility of MO).

Given a string $\alpha$ of length m, the string $\alpha[1 \ldots (m-1)]$ is defined as the l-parent ("l" for left) of $\alpha$, where $\alpha[1 \ldots (m-1)]$ is the substring of $\alpha$ starting at the 1st position and ending at the (m—1)-th position of $\alpha$ inclusively. Likewise, $\alpha[2 \ldots m]$ is defined as the r-parent ("r" for right) of $\alpha$. By rearranging the equations above, and given a string $\alpha = \alpha_1\alpha_1$ not in the PST T, the following inequality is obtained:

$$C_{\alpha_1\alpha_1} \leq C_{60\ 1} - \Sigma_{\alpha_2 \epsilon} A, \alpha_{2 \neq \alpha_1, \alpha_1\alpha_2 \epsilon T}(C_{\alpha_1\alpha_2})$$

and similarly, given a string $\alpha = \alpha_1\alpha_1$ not in the PST T, the following inequality is obtained:

$$C_{\alpha_1\alpha_1} \leq C_{60\ 1} - \Sigma_{\alpha_2 \epsilon} A, \alpha_{2 \neq \alpha_1, \alpha_2\alpha_1 \epsilon T}(C_{\alpha_1\alpha_2})$$

The two inequalities are denoted as l-ConPar($\alpha$,T) and r-ConPar($\alpha$,T), respectively. Given a string a not in the PST, l-ConPar($\alpha$,T) and r-ConPar($\alpha$,T) can be used to obtain constraints on the count of $C_{60}$ in terms of the counts of its l- and r-parents (as well as the counts of "siblings" of $\alpha$ in T). If a parent string is not in T, analogous constraints can be obtained on its count. Iterating this process until all the l- and r-parents are in T yields a set of projection constraints, denoted ConProj($\alpha$,T, p), which is a sound-approximation of ConComp(T,p). ConProj($\alpha$,T,p) can be formally defined as the projection of the following set of constraints on $C_\alpha$:

{ConPrune($\alpha_1$,T,p)|$\alpha_1 \epsilon T$}$\cup$

{l-ConPar($\alpha_1$,T)|$\alpha_1 \epsilon anc(\alpha,T)$}$\cup$

{r-ConPar($\alpha_1$,T)|$\alpha_1 \epsilon anc(\alpha,T)$}$\cup$

{ConPrune($\alpha_1$,T,p)} where anc($\alpha$,T) is the set of all ancestors of a that are not in T, i.e. it is the smallest set such that: (i) $\alpha \epsilon$ anc($\alpha$,T), and (ii) if $\alpha_1 \epsilon$ anc($\alpha$,T) and $\alpha_2$ is an l- or an r-parent of $\alpha_1$, such that $\alpha_2$ not in T, then $\alpha_2 \epsilon$ anc($\alpha$,T). As an example, consider the pruned o-suffix tree T shown in FIG. 1, with prune threshold p=5. For the substring query jones, anc(jones, T) is the set {jones, jone, ones}. Assume all relevant nodes are as shown. ConPro(jones,T,p) is given by the projection of the constraints below on $C_{jones}$:

$$C_{jones} \leq p=5$$

$$C_{jones} \leq C_{jone}$$

$$C_{jones} \leq C_{ones}$$

$$C_{jone} \leq C_{jon} - C_{Jond} = 10-7$$

$$C_{jone} \leq C_{one} = 15$$

$$C_{ones} \leq C_{one} - C_{oned} = 15-7$$

$$C_{ones} \leq C_{nes} - C_{anes} = 20-13$$

This simplifies to the single inequality $C_{jones} \leq 3$.

Given a pruned o-suffix tree T. with prune thresholds, and a string $\alpha$ not in T, ConProj($\alpha$,T,p) is a sound-approximation of the projection of ConComp(T,p) on $C_\alpha$, and of the form $C_\alpha \leq v_\alpha$, for some value $v_\alpha$. Accordingly, the constraints ConProj($\sigma$,T,p) can be used to create a new estimation algorithm, which is referred to as "maximal overlap with constraints" (MOC), and presented in FIG. 3. Intuitively, if MO($\sigma$) is a feasible value for $C_\sigma$ in ConProj($\sigma$,T,p), the estimate MOC($\sigma$) is the same as MO($\sigma$). Otherwise, MOC($\sigma$) is set to the largest possible feasible value, $v_\sigma$, of $C_\sigma$. Accordingly, with regard to o-suffix trees, MOC($\sigma$)$\leq$MO($\sigma$) for all $\sigma$ and MOC($\sigma$) provides a better estimate (in terms of log raio).

As an example, consider the pruned o-suffix tree in FIG. 1, and the substring query "jes." As shown in an example above, MO(jes)=KVI(jes)=2.5%. The constraint ConProj (jes, T,p) is given by:

$$C_{jes} \leq C_j - C_{jo} - C_{ja} = 20-10-10$$

As a result, MOCOes) would return 0, which is the only feasible value.

3. Maximal Overlap On Lattice

Figures 3, 4:
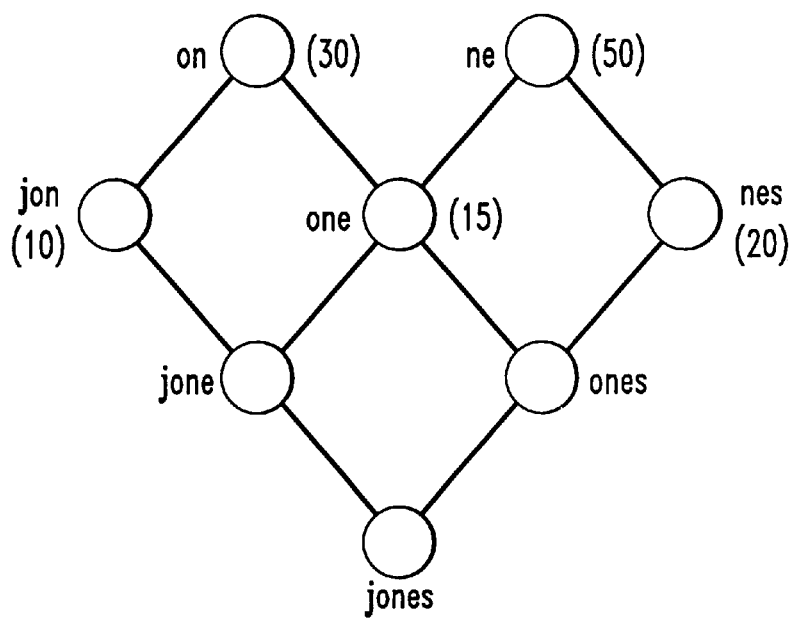
FIG. 3 is a representation of a method in accordance with an embodiment of the present invention.
FIG. 4 is a representation of a portion of a lattice.

The MOC($\sigma$) estimate improves on the MO($\sigma$) estimate by "applying" constraints that relate $C_\sigma$ to various $C_{60}$ in the pruned o-suffix T, such that $\alpha$ is a substring of $\sigma$. It is possible in principle, however, to "apply" the MOC algorithm one step at a time to all members of anc($\sigma$,T), and obtain an even better algorithm than MOC. The notion of a step-at-a-time computation can be formalized using a string completion lattice. FIG. 4 sets forth a relevant fragment of a string completion lattice for the substring "jones" with reference to the example PST shown in FIG. 1. Nodes with counts correspond to strings in the PST. The string completion lattice (denoted $L_\alpha$, for $\alpha$ not in PST T) can be defined more formally inductively as follows: (i) $\alpha$ is a node in $L_\alpha$; (ii) for any node $\alpha_1$ in $L_\alpha$, the l-parent and r-parent of $\alpha_1$ are also nodes in $L_\alpha$. There is an (undirected) edge ($\alpha_1,\alpha_2$) in $L_\alpha$ if $\alpha_1$ is an l-parent or an r-parent of $\alpha_2$. The depth of a node $\alpha_1$ in $L_\alpha$ is defined inductively as follows: if $\alpha_1$ is in T, depth($\alpha_1$)=0; otherwise, depth($\alpha_1$)=1+max{depth($\gamma_1$), depth($\gamma_2$)}, where $\gamma_1$, $\gamma_2$ are the l-parent and r-parent of $\alpha_1$.

Maximal overlap (MO) estimation can be extended to the lattice, as shown in FIG. 5 (referred to as a maximal overlap on lattice (MOL)). It can be show by induction on the depth that all terms on the right hand side of step 3.2 in FIG. 5 are known each time the step is executed. Intuitively, the MOL algorithm repeatedly applies the MO algorithm to "complete" the fragment of the lattice that "supports" the given substring query. As an example using the string completion lattice $L_{jones}$ in FIG. 4 and the PST in FIG. 1, MOL first estimates Pr(jone) as:

$$Pr(jone) = (Cjon/N) * (Cone/N)/(Con/N)$$
$$= (Cjon * Cone)/(N * Con)$$
$$= 2.5\%$$

and Pr(ones) as:

$$Pr(ones) = (Cone/N) * (Cnes/N)/(Cne/N)$$
$$= (Cone * Cnes)/(N * Cne)$$
$$= 3\%$$

Then MOL estimates Pr(jones) as:

$$Pr(jones) = Pr(jone) * Pr(ones)/Pr(one)$$
$$= (Pr(jone) * Pr(ones) * N)/Cone$$
$$= 1\%$$

giving the same estimate as MO. The identical estimates by MO and MOL in the above example are not a coincidence; it can be proved by induction on the depth of the string completion lattice of a substring query that MOL($\sigma$)=MO ($\sigma$), for all $\sigma$. In other words, MO estimation is sufficient to obtain the effect of full lattice completion.

On the other hand, incorporation of constraints has a positive effect over MOC. The MOL algorithm obtains estimates for the selectivities at multiple intermediate nodes and uses these as a basis to estimate the final answer. Some of these intermediate estimates, however, may be infeasible with respect to the constraints discussed previously. Better results can be expected if at each stage constraints on the intermediate estimates are applied and these constrained estimates are used to determine the final desired answer. FIG. 5 shows MOL modified along the lines of MOC, called "maximal overlap on lattice with constraints" (MOLC). As an example of estimation using MOLC, consider the MOL example above. MOLC modifies the MOL estimate Pr(jone) to 1.5%=3/200 because of the following constraint in ConProj(jone, T,p): Cjone≦Cjon−Cjond=3. Similarly, MOLC modifies the MOL estimate Pr(ones) to 2.5%=5/200 because of the following constraint in ConProj(ones, T,p): Cones≦p=5. Consequently, the MOLC estimate Pr(jones) is reduced to 0.5%=(3*5)/(15*200). Note that this is lower than the MO and MOC estimates.

With respect to pruned o-suffix trees, MOLC is a better estimate (in terms of log ratio) than MOC, which, as mentioned above, is a better estimate than MO. Assuming a unit cost for each level that the PST is traversed and that all traversals work their way down from the root (s=size of the alphabet, m=length of the substring query $\sigma$, d=depth of the PST), the worst-case time computational cost of the different estimation methods is:

Cost (KVI($\sigma$)) is $O(m)$.

Cost (MO($\sigma$)) is $O(m*d)$.

Cost (MOC($\sigma$)) is $O(m*s*d)$.

Cost (MOLC($\sigma$)) is $O(m^2*s*d)$.

The costs of computing the estimates MOC($\sigma$) and MOLC ($\sigma$) are dominated by the cost of computing the projection constraints. In the former case, it suffices to consider O(m) constraints, each of which may have O(s) terms. When a constraint is an r-ConPar($\alpha$,T) constraint, determining the counts of its terms requires traversing O(s) paths, each of length O(d). (Two additional constants per node in the PST can be pre-computed and stored, and the dependence of the cost on s can be eliminated.) This gives the O(m*s*d) bound. In the latter case, the projection constraints for each node n the string completion lattice L$\sigma$ can be computed. In the worst case there are $O(m^2)$ such nodes, leading to the given bound. Hence, in terms of the computational effort (running time) required, the ordering is the opposite of the estimation accuracy ordering.

Figure 6:
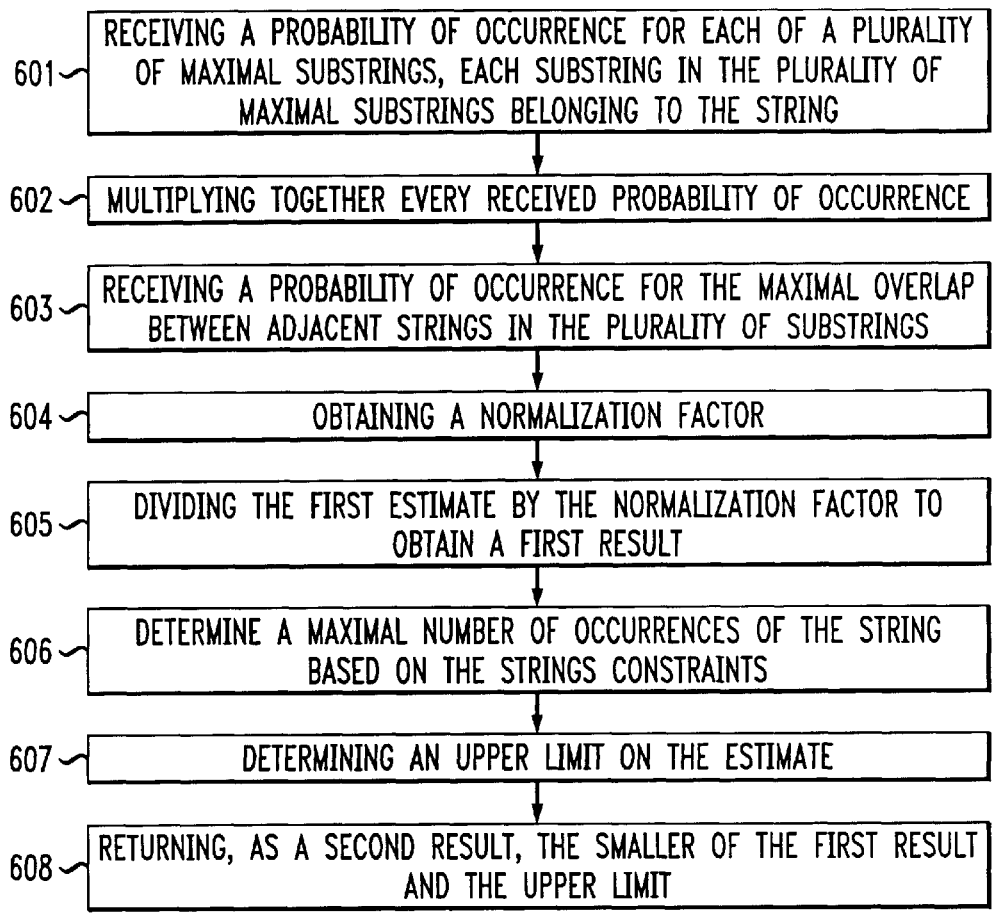
FIG. 6 is a flow chart representing an embodiment of the present invention.

FIG. 6 is a flow chart of an embodiment of the present invention in which a method is given for estimating string-occurrence probability in a database. In this embodiment, at step 601, a probability of occurrence is received for each of a plurality of maximal substrings. Each substring in the plurality of maximal substrings can belong to the string that is being queried. At step 602, all of the probabilities received in step 601 are multiplied together to obtain a first estimate of the string-occurrence probability in the database. At step 603, a probability of occurrence is received for the maximal overlap of each string in the plurality of substrings. A normalization factor is obtained at step 604. In one embodiment of the present invention, this normalization factor is obtained by multiplying together all of the probabilities received in step 603. At step 605, the first estimate determined in step 602 is divided by the normalization factor to obtain an estimate of the string-occurrence probability. This estimate can be returned as the result. Alternatively, this estimate can be further refined (at the cost of some efficiency). To further refine this estimate, constraints can be applied to the algorithm. At step 606, a maximal number of occurrences of the string is received. In this step, the maximal number of occurrences is based on the string's constraints as discussed above. At step 607, an upper limit on the estimate is determined. In one embodiment of the present invention, this upper limit can be determined by dividing the maximal number of occurrences determined in step 606 by a root count for the database. Once this new estimate is received, in step 608, the result can be returned. The result returned in step 608 can be the smaller of the estimate determined in step 605 and the upper limit determined in step 607. Thus, an estimate of substring selectivity is returned.

Figure 7:
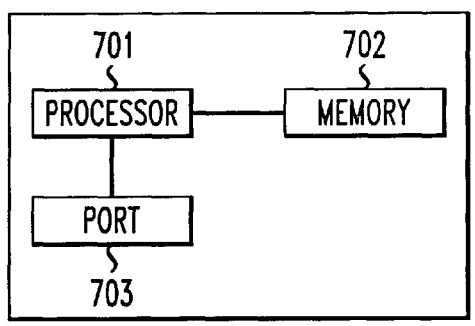
FIG. 7 is a block diagram of an apparatus embodiment of the present invention.

FIG. 7 is a block diagram of an embodiment of the present invention. In this embodiment, processor 701 is coupled to memory 702 and port 703. Memory 702 stores instructions adapted to be executed by a processor to perform any method embodiment of the present invention. For the purposes of this application, memory includes any medium capable of storing instructions adapted to be executed by a processor. Some examples of such media include, but are not limited to, RAM, ROM, floppy disks, CDROM, magnetic tape, hard drives, optical storage units, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for determining an estimate for string-occurrence probability in a database for a string, the method comprising:
   (a) receiving a first probability of occurrence for each maximal substring from a plurality of substrings, each maximal substring in the plurality of substrings belonging to the string;
   (b) obtaining an overall probability of occurrence;
   (c) receiving a probability of occurrence for a maximal overlap of each maximal substring in the plurality of maximal substrings;
   (d) obtaining a normalization factor; and
   (e) dividing the overall probability of occurrence by the normalization factor to obtain the estimate.

2. The method of claim 1, further comprising the step of
   (f) using the obtained estimate for query-cost determination.

3. The method of claim 1, wherein the overall probability of occurrence is obtained by multiplying together every probability of occurrence received in (a), and the normalization factor is obtained by multiplying together the probabilities received in (c).

4. The method of claim 3, wherein the database contains a number of strings, and the first probability of occurrence is defined as the number of strings in the database that contain the string, divided by a root count.

5. The method of claim 3, wherein the database is a pruned suffix tree.

6. The method of claim 3, further comprising the steps of:
   (f) obtaining an upper limit on the string occurrence probability in a database for the string; and
   (g) returning, as a new result, the smaller of the upper limit obtained in step (f) and the estimate obtained in step (e).

7. The method of claim 6, further comprising the step of:
   (h) using the new result for query-cost determination.

8. The method of claim 6, wherein said obtaining an upper limit on the estimate obtained in step (e) includes:
   (i) determining a maximal number of occurrences of the string based on the string's constraints; and
   (ii) dividing the maximal number of occurrences by a root count associated with the database, to produce an upper limit on the estimate.

9. The method of claim 8, wherein said determining a maximal number of occurrences includes applying a Con-Proj operator.

10. A method for determining an estimate for string-occurrence probability in a database for a string, the method comprising:
    (a) multiplying together every probability of occurrence of each maximal substring from a plurality of maximal substrings to generate a product, each substring in the plurality of maximal substrings belonging to the string;
    (b) multiplying together every probability of occurrence for a maximal overlap of each maximal substring in the plurality of maximal substrings to obtain a normalization factor; and
    (c) dividing the product by the normalization factor to obtain the estimate.

11. The method of claim 10, wherein the database contains a number of strings and a root count, and wherein the probability of occurrence is defined as the number of strings in the database that contain the string, divided by the root count.

12. The method of claim 11, wherein the database is a pruned suffix tree.

13. The method of claim 11, further comprising the steps of:
    (d) determining a maximal number of occurrences of the string based on the string's constraints;
    (e) dividing the maximal number of occurrences by a root count associated with the database to produce an upper limit on the second estimate; and
    (f) returning, as a new result, the smaller of the upper limit obtained in (e) and the second estimate obtained in (c).

14. The method of claim 13, wherein said determining a maximal number of occurrences includes applying a Con-Proj operator.

15. A method for estimating the cost of a query to a database that contains a plurality of strings and substrings, the method comprising:
    (a) receiving a probability of occurrence for each maximal substring from a plurality of substrings, each maximal substring in the plurality of substrings belonging to the string;
    (b) obtaining an overall probability of occurrence by multiplying together every probability of occurrence received in step (a);
    (c) receiving a probability of occurrence for a maximal overlap of each maximal substring in the plurality of maximal substrings;
    (d) obtaining a normalization factor by multiplying together the probabilities received in (c);
    (e) obtaining a string-occurrence probability for the string in the database by dividing the overall probability of occurrence by the normalization factor; and
    (f) using the string-occurrence probability for query-cost determination.

16. A method for determining the cost of a query to a database that contains a plurality of strings and substrings, the method comprising:
    (a) receiving a probability of occurrence for each maximal substring from a plurality of substrings, each maximal substring in the plurality of substrings belonging to a string;
    (b) obtaining an overall probability of occurrence by multiplying together every probability of occurrence received in step (a);
    (c) receiving a probability of occurrence for a maximal overlap of each maximal substring in the plurality of maximal substrings;
    (d) obtaining a normalization factor by multiplying together the probabilities received in (c);
    (e) obtaining a string-occurrence probability for the string in the database by dividing the overall probability of occurrence by the normalization factor;
    (f) obtaining an upper limit on the string-occurrence probability for the string; and
    (g) performing query-cost determination with the smaller of the upper limit obtained in step (f) and the string-occurrence probability obtained in step (e).

17. The method of claim 16, wherein said obtaining an upper limit on the string-occurrence probability includes:
    (i) determining a maximal number of occurrences of the string based on the string's constraints; and (ii) dividing the maximal number of occurrences by a root count associated with the database, to produce an upper limit on the string-occurrence probability.

18. An apparatus for estimating string-occurrence probability in a database for a string, the apparatus comprising:
   (a) a processor;
   (b) a port coupled to said processor; and
   (c) a memory coupled to said processor, said memory storing instructions adapted to be executed on said processor, the instructions including:
      (i) multiplying together every probability of occurrence of each maximal substring from a plurality of maximal substrings to generate a product, each substring in the plurality of maximal substrings belonging to the string;
      (ii) multiplying together every probability of occurrence for a maximal overlap of each maximal substring in the plurality of maximal substrings to obtain a normalization factor; and
      (iii) dividing the product by the normalization factor to obtain the estimate.

19. The apparatus of claim 18, wherein the database contains a number of strings and a root count, and wherein the probability of occurrence is defined as the number of strings in the database that contain the string, divided by the root count.

20. The apparatus of claim 18, wherein the database is a pruned suffix tree.

21. The apparatus of claim 18, said memory storing further instructions adapted to be executed on said processor, said further instructions comprising:
   (iv) determining a maximal number of occurrences of the string based on the string's constraints;
   (v) dividing the maximal number of occurrences by a root count associated with the database to produce an upper limit on the second estimate; and
   (vi) returning, as a new result, the smaller of the upper limit obtained in (e) and the second estimate obtained in (iii).

22. The apparatus of claim 21, wherein said determining a maximal number of occurrences includes applying a ConProj operator.

23. An apparatus for estimating string-occurrence probability in a database for a string, the apparatus comprising:
   (a) a processor;
   (b) a port coupled to said processor; and
   (c) a memory coupled to said processor, said memory storing instructions adapted to be executed on said processor, the instructions including:
      (i) receiving a probability of occurrence for each maximal substring from a plurality of substrings, each maximal substring in the plurality of substrings belonging to the string;
      (ii) obtaining an overall probability of occurrence by multiplying together every probability of occurrence received in step (i);
      (iii) receiving a probability of occurrence for a maximal overlap of each maximal substring in the plurality of maximal substrings;
      (iv) obtaining a normalization factor by multiplying together the probabilities received in (iii);
      (v) obtaining a string-occurrence probability for the string in the database by dividing the overall probability of occurrence by the normalization factor; and
      (vi) using the string-occurrence probability for query-cost determination.

24. An apparatus for determining the cost of a query to a database that contains a plurality of strings and substrings, the apparatus comprising:
   (a) a processor;
   (b) a port coupled to said processor; and
   (c) a memory coupled to said processor, said memory storing instructions adapted to be executed on said processor, the instructions including:
      (i) receiving a probability of occurrence for each maximal substring from a plurality of substrings, each maximal substring in the plurality of substrings belonging to a string;
      (ii) obtaining an overall probability of occurrence by multiplying together every probability of occurrence received in step (i);
      (iii) receiving a probability of occurrence for a maximal overlap of each maximal substring in the plurality of maximal substrings;
      (iv) obtaining a normalization factor by multiplying together the probabilities received in (iii);
      (v) obtaining a string-occurrence probability for the string in the database by dividing the overall probability of occurrence by the normalization factor;
      (vi) obtaining an upper limit on the string-occurrence probability for the string; and
      (vii) performing query-cost determination with the smaller of the upper limit obtained in step (vi) and the string-occurrence probability obtained in step (v).

25. The apparatus of claim 24, wherein said obtaining an upper limit on the string-occurrence probability includes:
   (i) determining a maximal number of occurrences of the string based on the string's constraints; and
   (ii) dividing the maximal number of occurrences by a root count associated with the database, to produce an upper limit on the string-occurrence probability.

26. A medium for determining an estimate for string-occurrence probability in a database for a string, the medium containing instructions adapted to be executed by a processor, the instructions comprising:
   (a) receiving a first probability of occurrence for each maximal substring from a plurality of substrings, each maximal substring in the plurality of substrings belonging to the string;
   (b) obtaining an overall probability of occurrence;
   (c) receiving a probability of occurrence for a maximal overlap of each maximal substring in the plurality of maximal substrings;
   (d) obtaining a normalization factor; and
   (e) dividing the overall probability of occurrence by the normalization factor to obtain the estimate.

27. The medium of claim 26, the medium containing further instructions adapted to be executed by a processor, the further instructions comprising:
   (f) using the obtained estimate for query-cost determination.

28. The medium of claim 26, wherein the overall probability of occurrence is obtained by multiplying together every probability of occurrence received in (a), and the normalization factor is obtained by multiplying together the probabilities received in (c).

29. The medium of claim 28, wherein the database contains a number of strings, and the first probability of occurrence is defined as the number of strings in the database that contain the string, divided by a root count.

30. The medium of claim 28, further comprising the steps of:
(f) obtaining an upper limit on the string occurrence probability in a database for the string; and
(g) returning, as a new result, the smaller of the upper limit obtained in step (f) and the estimate obtained in step (e).

31. The medium of claim 30, further comprising the step of:
(h) using the new result for query-cost determination.

32. The medium of claim 30, wherein said obtaining an upper limit on the estimate obtained in step (e) includes:
(i) determining a maximal number of occurrences of the string based on the string's constraints; and
(ii) dividing the maximal number of occurrences by a root count associated with the database, to produce an upper limit on the estimate.

33. A medium for determining an estimate for string-occurrence probability in a database for a string, the medium storing instructions adapted to be executed by a processor, the instructions comprising:
(a) multiplying together every probability of occurrence of each maximal substring from a plurality of maximal substrings to generate a product, each substring in the plurality of maximal substrings belonging to the string;
(b) multiplying together every probability of occurrence for a maximal overlap of each maximal substring in the plurality of maximal substrings to obtain a normalization factor; and
(c) dividing the product by the normalization factor to obtain the estimate.

34. The medium of claim 33, wherein the database contains a number of strings and a root count, and wherein the probability of occurrence is defined as the number of strings in the database that contain the string, divided by the root count.

35. The medium of claim 34, further comprising the steps of:
(d) determining a maximal number of occurrences of the string based on the string's constraints;
(e) dividing the maximal number of occurrences by a root count associated with the database to produce an upper limit on the second estimate; and
(f) returning, as a new result, the smaller of the upper limit obtained in (e) and the second estimate obtained in (c).

* * * * *